US012770388B2

(12) United States Patent
Kato et al.

(10) Patent No.: US 12,770,388 B2
(45) Date of Patent: Oct. 20, 2026

(54) DATA PROCESSING APPARATUS AND DATA PROCESSING METHOD

(71) Applicant: CANON KABUSHIKI KAISHA, Tokyo (JP)

(72) Inventors: Masami Kato, Kanagawa (JP); Tsewei Chen, Tokyo (JP); Motoki Yoshinaga, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 379 days.

(21) Appl. No.: 18/517,597

(22) Filed: Nov. 22, 2023

(65) Prior Publication Data

US 2024/0177475 A1 May 30, 2024

(30) Foreign Application Priority Data

Nov. 29, 2022 (JP) ................................. 2022-190841

(51) Int. Cl.
*G06V 10/70* (2022.01)
*G06V 10/77* (2022.01)
*G06V 10/82* (2022.01)

(52) U.S. Cl.
CPC .......... *G06V 10/87* (2022.01); *G06V 10/7715* (2022.01); *G06V 10/82* (2022.01)

(58) Field of Classification Search
CPC ..... G06V 10/87; G06V 10/7715; G06V 10/82
See application file for complete search history.

(56) References Cited

U.S. PATENT DOCUMENTS 9,710,265 B1 * 7/2017 Temam ................. G06F 9/3001
10,013,628 B2 * 7/2018 Kato .................... G06V 10/955
11,113,576 B2 * 9/2021 Saruta .................... G06N 20/10
2019/0294982 A1 * 9/2019 Guttmann .............. G06N 5/025
2019/0294984 A1 * 9/2019 Guttmann .............. G06N 5/025
2019/0294999 A1 * 9/2019 Guttmann .............. G06N 5/025
2020/0372332 A1 * 11/2020 Kimura .................. G06N 3/045
2021/0112191 A1 * 4/2021 Maeno ................. G06V 10/147

FOREIGN PATENT DOCUMENTS

JP 2020140546 A 9/2020
JP 2022175874 A 11/2022

OTHER PUBLICATIONS

Laredo et al., 2019, "Automatic Model Selection for Neural Networks" (pp. 1-31) (Year: 2019).*
Lecun, Yann, et al., "Convolutional Networks and Applications in Vision," International Symposium on Circuits and Systems (ISCAS-10), IEEE 2010, Computer Science Department, Courant Institute of Mathematical Sciences, New York University.

* cited by examiner

*Primary Examiner* — Manav Seth
(74) *Attorney, Agent, or Firm* — Canon.U.S.A., .Inc.

(57) ABSTRACT

A data processing apparatus includes a storage unit configured to store a plurality of types of parameter groups to be used in a plurality of types of recognition tasks, a selection unit configured to select two or more recognition tasks to be executed from among the plurality of types of recognition tasks, a holding unit configured to hold parameter groups, a transfer unit configured to transfer parameter groups to be used in the two or more recognition tasks in sequence from the storage unit to the holding unit, and an execution unit configured to execute the two or more recognition tasks in sequence using the parameter groups held in the holding unit.

11 Claims, 12 Drawing Sheets

DATA PROCESSING APPARATUS AND DATA PROCESSING METHOD

BACKGROUND

Field of the Disclosure

The present disclosure relates to a data processing apparatus that executes multitask recognition for detecting a plurality of types of target objects in image data, and a data processing method.

Description of the Related Art

Hierarchical operation methods, typified by convolutional neural networks (hereinafter, abbreviated as CNNs) have received attention. Using such methods, pattern recognition methods that are robust against variations in recognition targets have been under study based on deep learning techniques. For example, Yann LeCun, Koray Kavukvuoglu and Clément Farabet: Convolutional Networks and Applications in Vision, Proc. International Symposium on Circuits and Systems (ISCAS'10), IEEE, 2010, discusses various application examples and implementation examples.

Japanese Patent Application Laid-Open No. 2020-140546 discusses a method for efficiently learning a plurality of recognition tasks using common features by CNNs. In addition, Yann LeCun, Koray Kavukvuoglu and Clément Farabet: Convolutional Networks and Applications in Vision, Proc. International Symposium on Circuits and Systems (ISCAS'10), IEEE, 2010, discusses a configuration of various parameter groups (hereinafter, called operation parameters) for efficiently processing CNNs.

In multitask recognition apparatuses, there may be a case where only one specific recognition task is to be selectively executed from among a plurality of recognition tasks, depending on use cases. Japanese Patent Application Laid-Open No. 2020-140546 discusses a method for executing a plurality of predetermined recognition tasks using common features. According to this method, however, the software of a CPU for multitask processing needs to be replaced by another piece of software in a case where a specific recognition task is selectively executed, thus the recognition tasks cannot be efficiently executed. Yann LeCun, Koray Kavukvuoglu and Clement Farabet: Convolutional Networks and Applications in Vision, Proc. International Symposium on Circuits and Systems (ISCAS'10), IEEE, 2010, discusses a method for efficiently performing hardware processing on CNNs with reference to operation parameters necessary for execution of recognition tasks.

However, in the case of selectively executing multitask recognition, it is necessary to prepare a plurality of operation parameters for each combination of selected tasks, which causes an increase in the total quantity of operation parameters.

SUMMARY

According to an aspect of the present disclosure, a data processing apparatus includes a storage unit configured to store a plurality of types of parameter groups to be used in a plurality of types of recognition tasks, a selection unit configured to select two or more recognition tasks to be executed from among the plurality of types of recognition tasks, a holding unit configured to hold parameter groups, a transfer unit configured to transfer parameter groups to be used in the two or more recognition tasks in sequence from the storage unit to the holding unit, and an execution unit configured to execute the two or more recognition tasks in sequence using the parameter groups held in the holding unit.

Further features of the present disclosure will become apparent from the following description of exemplary embodiments with reference to the attached drawings.

DESCRIPTION OF THE EMBODIMENTS

Hereinafter, exemplary embodiments of the present disclosure will be described in detail with reference to the drawings. Configurations described in the following exemplary embodiments are typical examples, and the scope of the present disclosure is not limited to these specific configurations.

Figure 2:
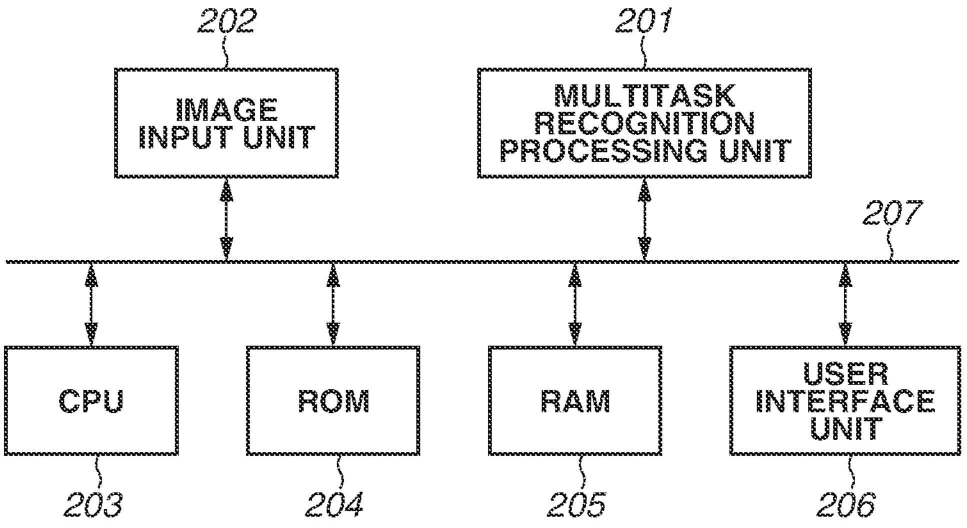
FIG. 2 is a diagram illustrating a data processing apparatus including the multitask recognition processing unit according to one or more aspects of the present disclosure.

FIG. 2 illustrates a configuration example of a data processing apparatus using multitask recognition processing according to a first exemplary embodiment. This apparatus has a function of recognizing the position of a specific object or a specific region in image data. "Task" is defined here as a unit of recognition processing for recognizing a predetermined target.

Referring to FIG. 2, a multitask recognition processing unit 201 is provided. An image input unit 202 includes an optical system such as a lens and a photoelectric conversion device such as a charge-coupled device (CCD) sensor or a complementary metal oxide semiconductor (CMOS) sensor. The image input unit 202 further includes a driver circuit for controlling sensors and an analog-digital (AD) converter.

The multitask recognition processing unit 201 executes a plurality of kinds of recognition processing (recognition tasks) on image data acquired by the image input unit 202.

A central processing unit (CPU) 203 controls the entire imaging apparatus. A read only memory (ROM) 204 stores commands and various types of parameter data that define operations of the CPU 203. A random access memory (RAM) 205 is used as a work memory necessary for operations of the CPU 203. The RAM 205 is constituted by a large-capacity dynamic access memory (DRAM) and other components. A user interface unit 206 includes a display device for displaying recognition results and a graphical user interface (GUI) for designating a recognition task. A data bus 207 is a data transfer path between the devices.

The multitask recognition processing unit 201 executes two or more recognition tasks selected according to an instruction from the CPU 203, and stores the results in the RAM 205. The CPU 203 provides various applications using the multitask recognition results. For example, the CPU 203 supplies the recognition results to the image input unit 202 so that the recognition results are used for control of focusing of the optical system, exposure control of sensors, and white-balance control.

Figure 1:
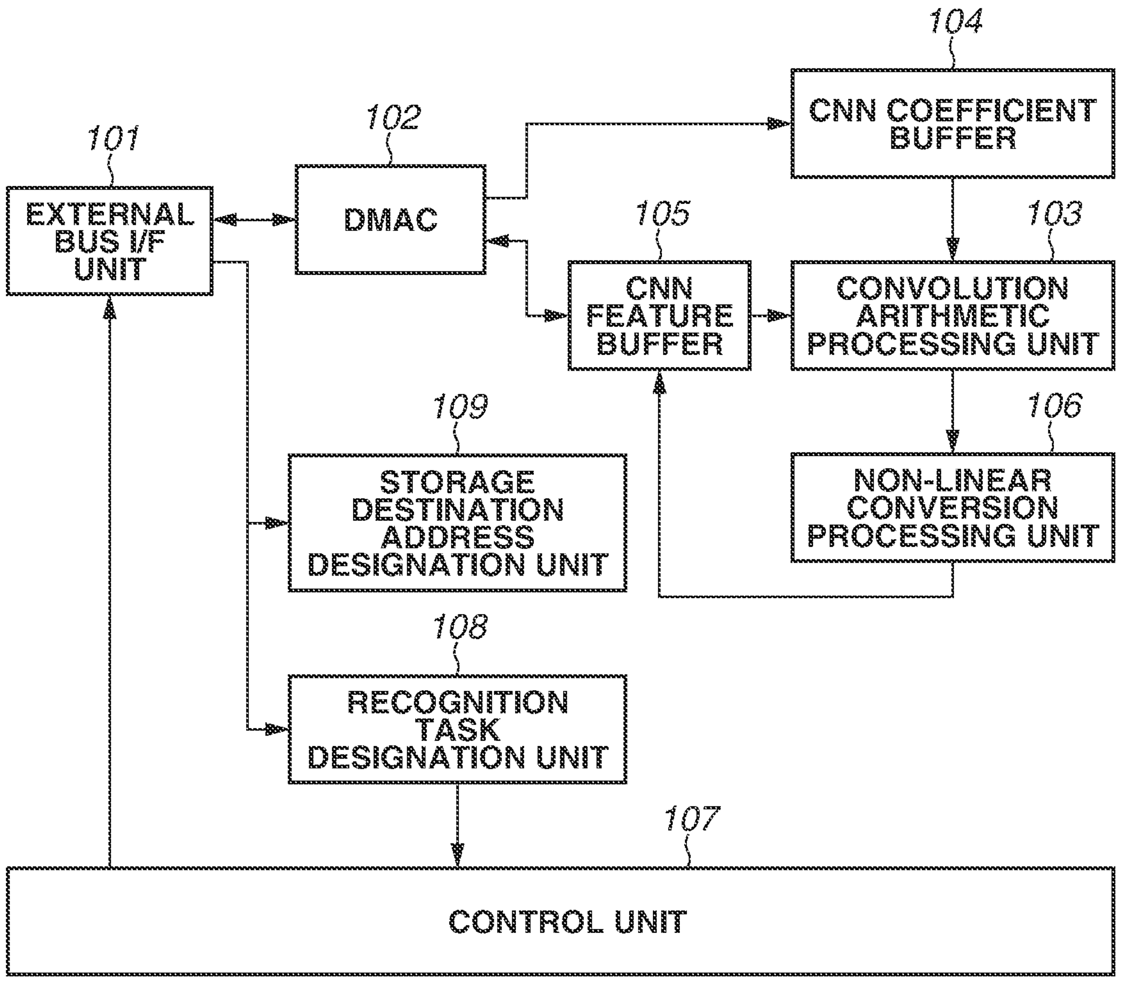
FIG. 1 is a diagram illustrating a configuration of a multitask recognition processing unit according to one or more aspects of the present disclosure.

FIG. 1 is a diagram illustrating a functional configuration of the multitask recognition processing unit 201 according to the present exemplary embodiment. In the present exemplary embodiment, multitask recognition processing is executed by using a convolutional neural network (CNN). An external bus interface (I/F) unit 101 is an interface with which the CPU 203, a direct memory access controller (DMAC) 102, and a control unit 107 can access one another via the data bus 207. The DMAC 102 transfers various types of data between the multitask recognition processing unit 201 and the RAM 205.

A convolution arithmetic processing unit 103 executes a convolutional operation with reference to a CNN coefficient (filter coefficient described below) stored in a CNN coefficient buffer 104 and CNN feature data stored in a CNN feature buffer 105. The CNN feature buffer 105 holds a CNN operation result in the layer preceding the target layer to be processed as CNN feature data to be referred to, and further holds a CNN operation result in the target layer to be processed as CNN feature data to be referred to in the next layer.

The CNN coefficient buffer 104 is a coefficient holding unit that supplies a coefficient with low delay to the convolution arithmetic processing unit 103, and is constituted by a high-speed static random access memory (SRAM) and a register. The CNN coefficient buffer 104 holds coefficients to be used in a plurality of hierarchical operations.

The CNN feature buffer 105 is a storage unit that stores results of operations by the convolution arithmetic processing unit 103 or a non-linear conversion processing unit 106. As with the CNN coefficient buffer 104, the CNN feature buffer 105 is constituted by a high-speed SRAM and other components.

The non-linear conversion processing unit 106 performs non-linear conversion on the outputs of results of convolutional operations performed by the convolution arithmetic processing unit 103. The non-linear conversion is performed by a well-known method such as a rectified linear unit (ReLU) or a sigmoid function. In the case of using a ReLU, the non-linear conversion can be implemented by threshold-based processing, and in the case of using a sigmoid function, the values are converted using a lookup table or the like.

The control unit 107 controls operations of the DMAC that performs CNN operations by performing convolutional operations and transfers various types of data. The control unit 107 is constituted by a hardware sequencer that controls access to the convolution arithmetic processing unit 103, the CNN coefficient buffer 104 and the CNN feature buffer 105, a simple CPU, and other components. A recognition task designation unit 108 is a register for designating a recognition task to be executed by the CPU 203. A storage destination address designation unit 109 is a register for designating an address on the RAM 205 at which the CPU 203 stores an operation parameter set described below.

The convolution arithmetic processing unit 103 has a convolutional operation kernel (filter coefficient matrix: CNN coefficient) with a size of columnSize×rowSize. If the number of feature maps (the feature map will be defined below) in the previous layer is L, one CNN feature is calculated by a convolutional operation as expressed in the following equation (1):

$$\text{output}(x, y) = \sum_{l=1}^{L} \sum_{row=rowSize/2}^{rowSize/2} \sum_{column=-columnSize/2}^{columnSize/2} \text{input}(x + \text{column}, y + \text{row}) \times \text{weight}(\text{column}, \text{row}) \tag{1}$$

where input(x, y): reference pixel value at two-dimensional coordinates (x, y), output(x, y): operation result at two-dimensional coordinates (x, y), weight(column, row): CNN coefficient at coordinates (x+column, y+row), L: number of feature maps in the previous layer, and columnSize, rowSize: horizontal and vertical sizes of a two-dimensional convolutional kernel.

In CNN operation processing, generally, a product sum operation is repeated while scanning an input image or a feature map in the previous layer on a pixel-by-pixel basis by using a plurality of convolutional operation kernels. Then, the final product sum operation results are subjected to non-linear conversion (activation processing) to calculate a feature map of the target layer. That is, the plurality of spatial filter operations and the results of non-linear operation of the sum of the spatial filter operations constitute pixel data of one feature map to be generated. The CNN coefficient is equivalent to a spatial filter coefficient, and is also called a connection coefficient because the CNN coefficient expresses the connection relationship between feature maps. In actuality, a plurality of feature maps is generated for each layer.

Figure 3:
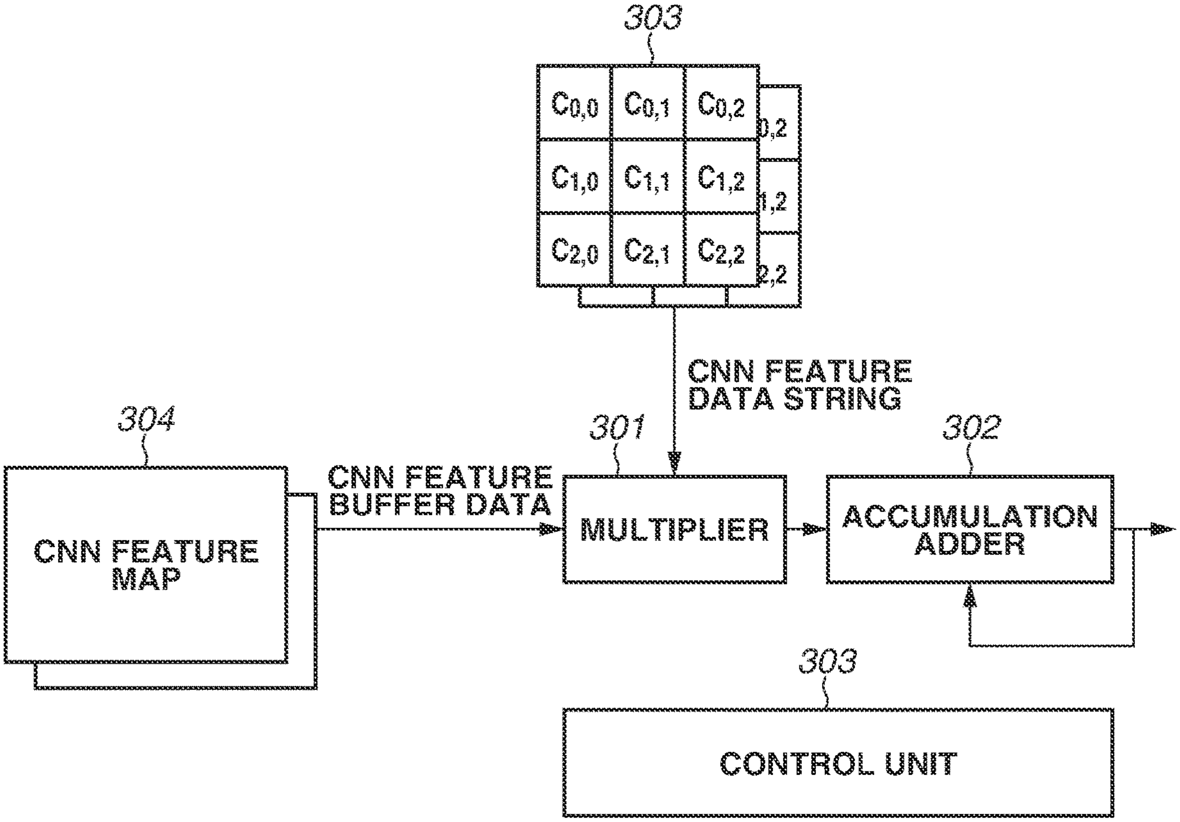
FIG. 3 is a diagram illustrating a configuration of a convolutional operation unit according to one or more aspects of the present disclosure.

FIG. 3 illustrates a configuration example of the convolution arithmetic processing unit 103. The convolution arithmetic processing unit 103 includes a multiplier 301 and an accumulation adder 302, and executes the convolutional operation processing expressed in the equation (1). The non-linear conversion processing unit 106 executes non-linear conversion processing on the results of the convolutional operation processing. Hereinafter, the CNN features will be called feature maps because the CNN features can be expressed in a form of a plurality of two-dimensional maps. In a general CNN, the above-described processing is repeated the number of times equal to the number of feature maps to be generated. The calculated feature maps are stored in the CNN feature buffer 105.

A control unit 303 is a control unit for controlling convolutional operation processing, and the control unit 303 implements CNN operations in cooperation with the control unit 107 of the multitask recognition processing unit 201. The control unit 303 includes a storage unit that stores setting information related to operations corresponding to the configuration of the CNN to be processed, and implements hierarchical operation processing in accordance with the information. The control unit 303 also has a function of controlling the CNN coefficient buffer 104 and the CNN feature buffer 105, and processes all the layers of the CNN by controlling a predetermined buffer for each layer. Since a CNN coefficient is formed of a large amount of data, all the coefficients are stored in the RAM 205 and only data necessary for an operation is transferred by the DMAC 102 to the CNN coefficient buffer 104 for use in the operation.

Figure 4:
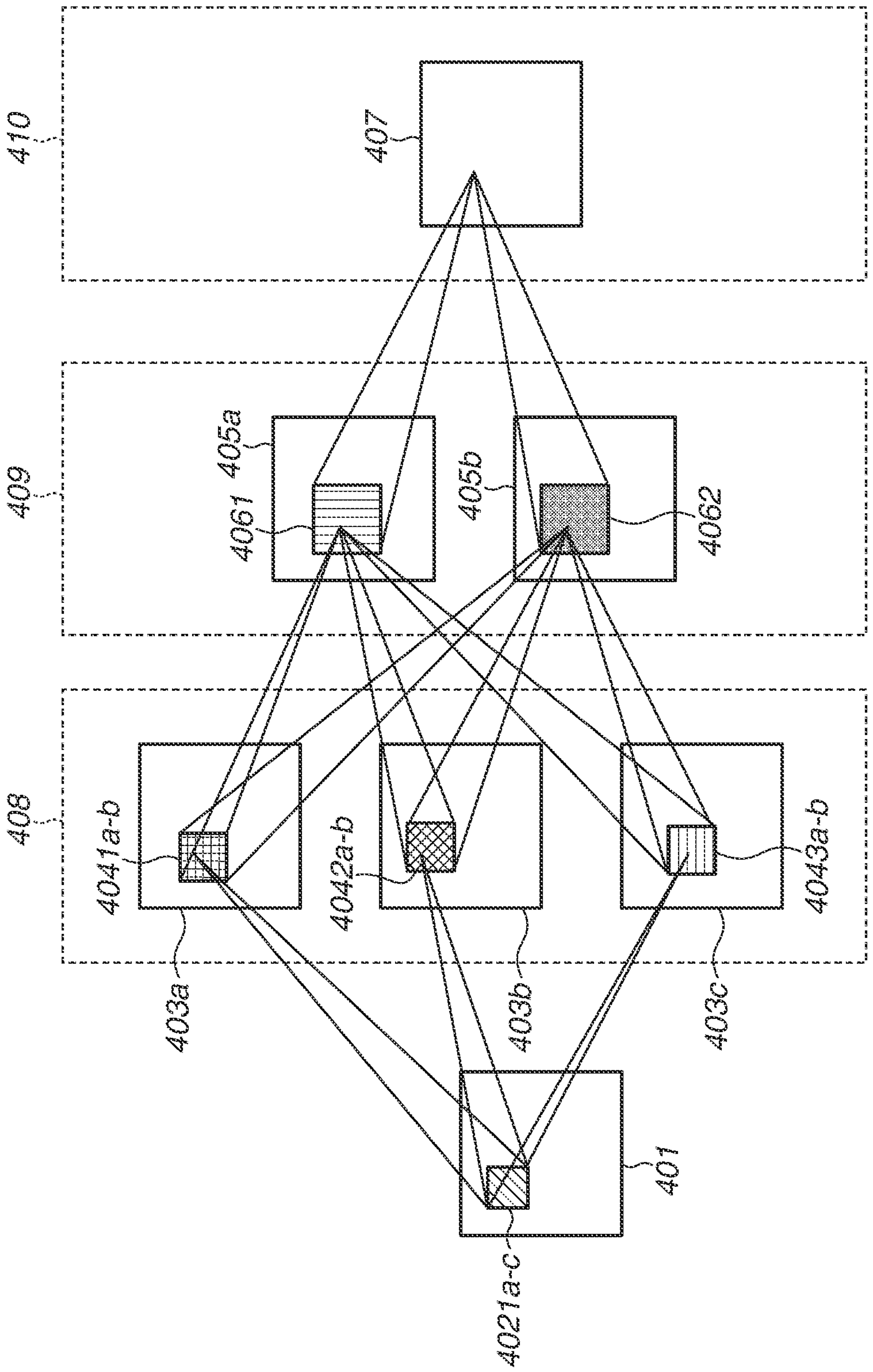
FIG. 4 is a diagram illustrating a configuration example of a convolutional neural network (CNN).

A network for implementing recognition processing using a CNN will be described with reference to FIG. 4.

In the present exemplary embodiment, the case of using a small CNN (three layers) is described. In actuality, a CNN includes a large number of feature maps and a large number of layers.

An input image 401 is an input image in an input layer that is equivalent to raster-scanned image data of a predetermined size in the case of performing CNN operation processing on the image data. Feature maps 403*a* to 403*c* are feature maps in a first layer 408. Since feature maps are results of processing on raster-scanned image data, the processing results are also formed of two-dimensional planes as described above. The feature maps 403*a* to 403*c* are calculated by performing a convolutional operation and non-linear processing on the input image 401. For example, the feature map 403*a* is calculated by performing a convolutional operation using a schematically illustrated two-dimensional convolutional kernel 4021*a* and performing non-linear conversion on the operation result. A feature map 405*a* is obtained by performing a convolutional operation on the feature maps 403*a* to 403*c* using convolutional kernels 4041*a* to 4043*a*, respectively, and executing non-linear conversion processing on the sum of the operation results. In the CNN, operations of feature maps are executed in sequence by performing hierarchical processing using convolutional kernels in this manner.

In a case where predetermined training has been executed on the CNN, in a task primarily intended to detect the position of an object, for example, a feature map 407 in the final layer has a high value in data corresponding to the position of the detection target. In a task primarily intended to determine the region of a target object, the feature map 407 has a high value in data indicating the region of the target object. The training is procedure of determining the CNN coefficient and is performed in advance in an apparatus different from the data processing apparatus. Various well-known methods are applicable to the training. The control unit 303 in the convolution arithmetic processing unit 103 is responsible for controlling the storage of feature map data necessary for CNN processing into the CNN feature buffer 105 and the transfer of the CNN coefficient to the multiplier 301.

Figure 5:
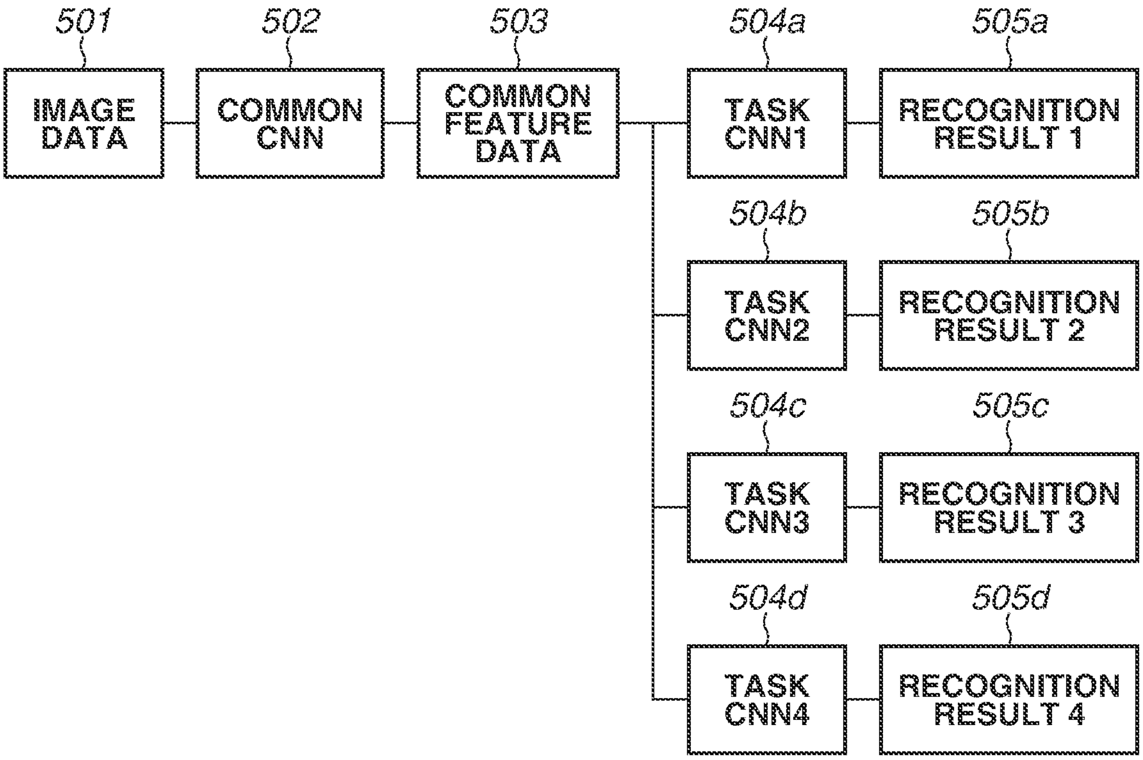
FIG. 5 is a diagram describing a configuration example of a multitask recognition CNN.

Next, a network configuration for a case of executing multitask recognition will be described. FIG. 5 is a diagram schematically illustrating an example of a multitask configuration. Image data 501 is image data of an input image. A common CNN 502 is used to extract a feature amount that is common to the recognition tasks and is constituted by a network including a plurality of layers as described above with reference to FIG. 4. Common feature data 503 is extracted as a common feature amount that is common to the recognition tasks and is equivalent to an output from the final layer of the common CNN 502. The common feature data 503 includes a plurality of feature maps to hold a variety of features. Tasks 504*a* to 504*d* are tasks CNN1 to CNN4 for executing recognition processing tasks for predetermined target objects, and the tasks 504*a* to 504*d* execute recognition processing for different targets. The recognition targets are, for example, four different types consisting of the head, trunk, hands, and legs of a person, or four different types consisting of person, dog, cat, and bird. Feature maps 505*a* to 505*d* are feature maps as recognition results 1 to 4 of the recognition tasks.

In general, in the case of executing a plurality of recognition tasks, it is necessary to transfer image data for each recognition task. However, in the multitask recognition according to the present exemplary embodiment, a plurality of recognition tasks can be executed by transferring image data once, so that it is possible to reduce the overhead associated with image transfer. This enables high-speed execution of recognition processing for a plurality of targets. In addition, the use of common feature data in the plurality of recognition tasks allows reduction in the sizes of configurations of a plurality of task CNNs.

Figure 6:
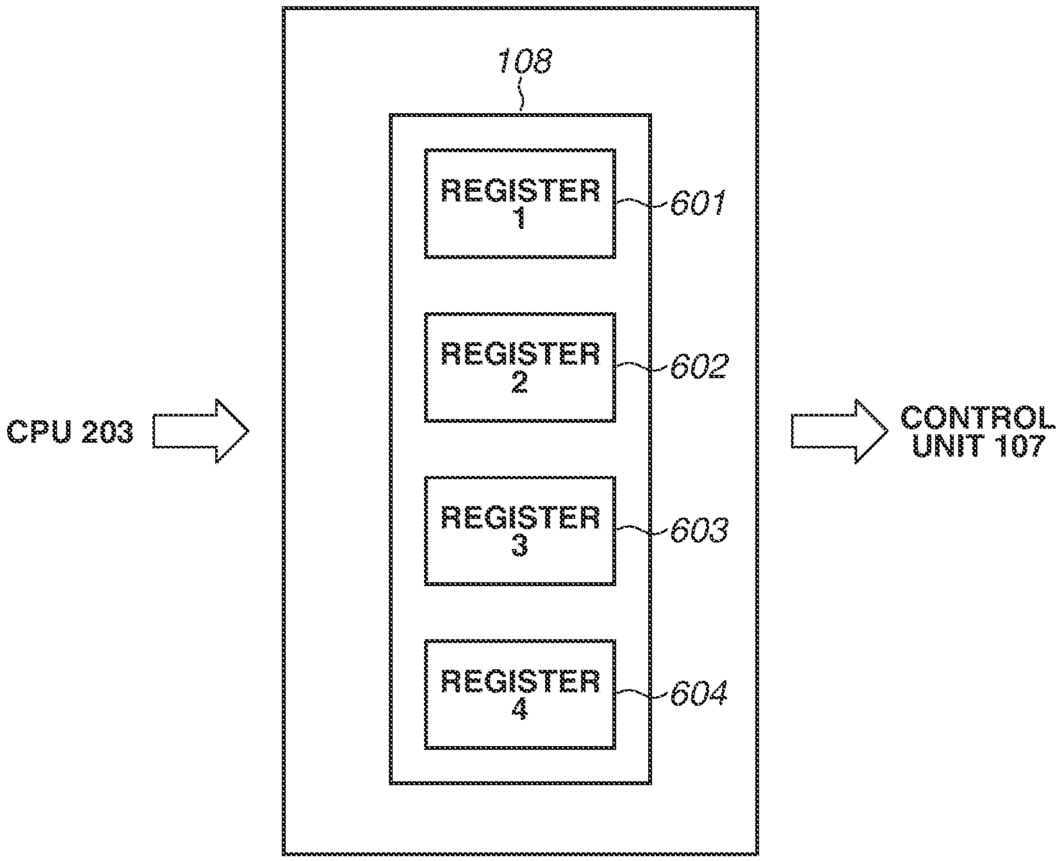
FIG. 6 is a diagram illustrating a configuration example of a recognition task designation unit according to one or more aspects of the present disclosure.

FIG. 6 is a diagram illustrating a configuration of the recognition task designation unit 108. The recognition task designation unit 108 includes registers that are accessible from the CPU 203 and the control unit 107. Registers 601 to 604 (registers 1 to 4) correspond to recognition tasks 1 to 4, respectively, and each of the registers 601 to 604 is constituted by a 1-bit flipflop or the like.

The CPU 203 sets a value (=1) to a register corresponding to a recognition task to be executed, among the registers 601 to 604, via the external bus I/F unit 101 prior to execution of the recognition processing. The control unit 107 sequentially transfers parameters necessary for respective operations of designated recognition tasks in accordance with the settings of the registers 601 to 604 to control processing operations of the tasks CNN1 to CNN4.

Like the recognition task designation unit 108, the storage destination address designation unit 109 that designates the storage destination of an operation parameter set also includes registers (flipflops of which the number of bits can express the storage destination address) that are accessible from the CPU 203 and the control unit 107.

Figure 7:
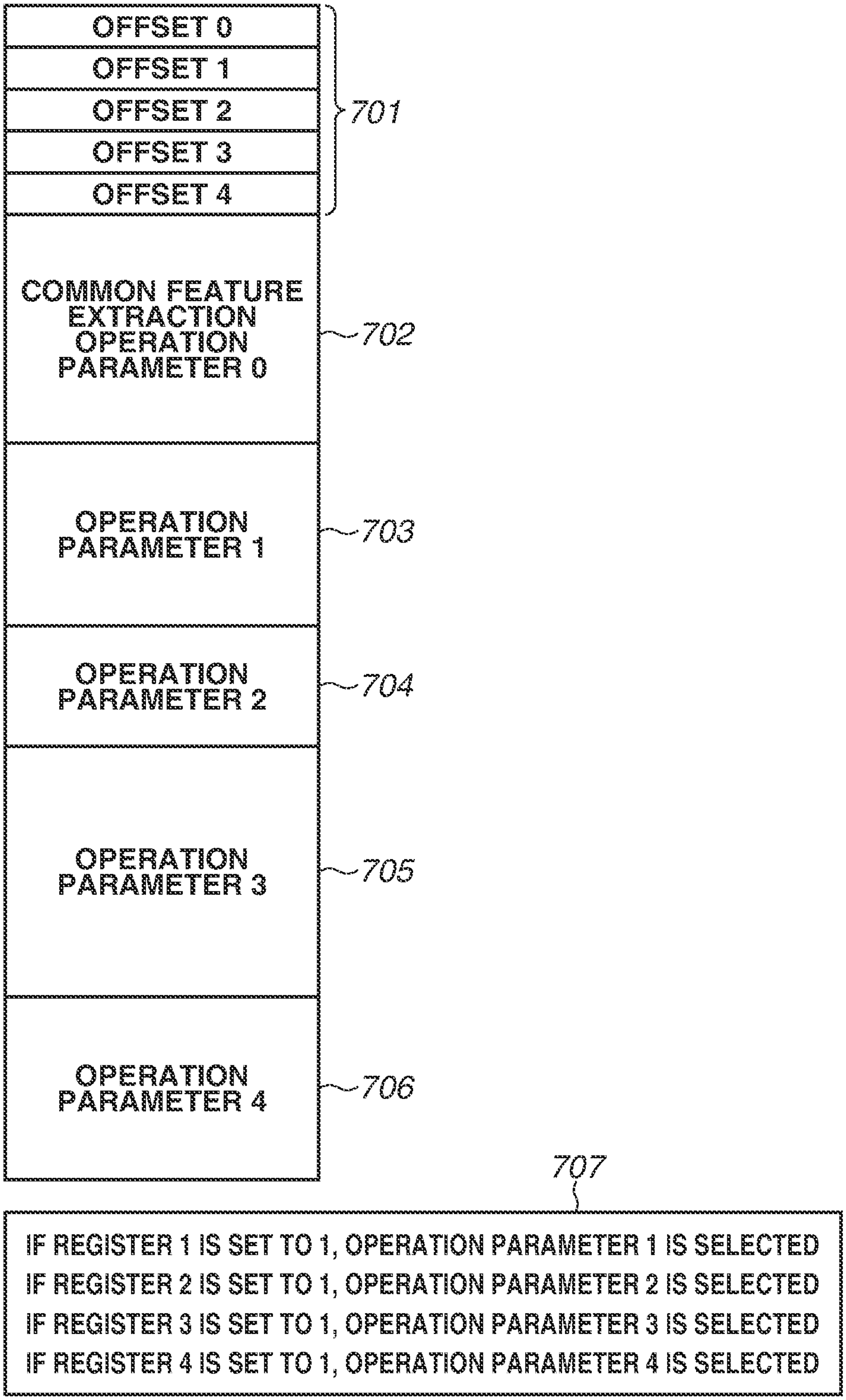
FIG. 7 is a diagram illustrating an example of an operation parameter set according to one or more aspects of the present disclosure.

FIG. 7 is a diagram illustrating a configuration of an operation parameter set for implementing multitask processing. The operation parameter set illustrated in FIG. 7 includes operation parameters consisting of parameter groups including filter coefficients (CNN coefficients) of convolutional kernels that are based on CNN training results and setting values necessary for executing the CNN. The operation parameter set is a collection of operation parameters for feature extraction and a plurality of tasks.

A common feature extraction operation parameter 702 (common feature extraction operation parameter 0) is a common parameter group for the common CNN 502 that extracts common feature data from each task. Operation parameters 703 to 706 correspond to recognition tasks 1 to 4, respectively. The operation parameters include various parameters such as filter coefficients obtained by performing advance training using a publicly known CNN training tool and setting values necessary for operating hardware. The setting values here include information defining a configuration of the CNN such as the number of layers and the number of feature maps to be processed, information on the storage destination of feature maps in the CNN feature buffer 105, information on the storage destination of coefficients to be stored in the CNN coefficient buffer 104.

The operation parameter set is stored in the RAM 205 by the CPU 203 before start of multitask recognition processing. A register definition 707 of the recognition task designation unit 108 corresponds to the operation parameter set. For example, if 1 is set to the register 1 (601), the recognition task 1 is executed using the operation parameter 1.

Offset information 701 is necessary for access to the common feature extraction operation parameter and the operation parameters 1 to 4. In the offset information 701, offset 0 is offset information on the head address of the storage destination of the common feature extraction operation parameter. Offsets 1 to 4 are pieces of offset information on the head addresses of the storage destinations of the operation parameter sets of the operation parameters 1 to 4 in the RAM 205. The pieces of offset information also record data sizes of the operation parameters.

The storage destination of the operation parameter for a recognition task to be executed can be acquired by adding up the address information stored in the storage destination address designation unit 109 and the address information described in the offset information. The control unit 107 decides recognition tasks to be executed in accordance with the setting content of the register definition 707 of the recognition task designation unit 108, transfers the corresponding operation parameters from the operation parameter set stored in the RAM 205 to the multitask recognition processing unit 201, and executes the predetermined recognition tasks.

In the execution of the recognition tasks, the operation parameter for common feature extraction is always transferred to execute CNN processing. A plurality of recognition tasks is executed in descending or ascending order of bit positions designated for execution of the recognition tasks by the recognition task designation unit 108. Using a simple method for determining the execution order simplifies the processing in the control unit 107.

Figure 8:
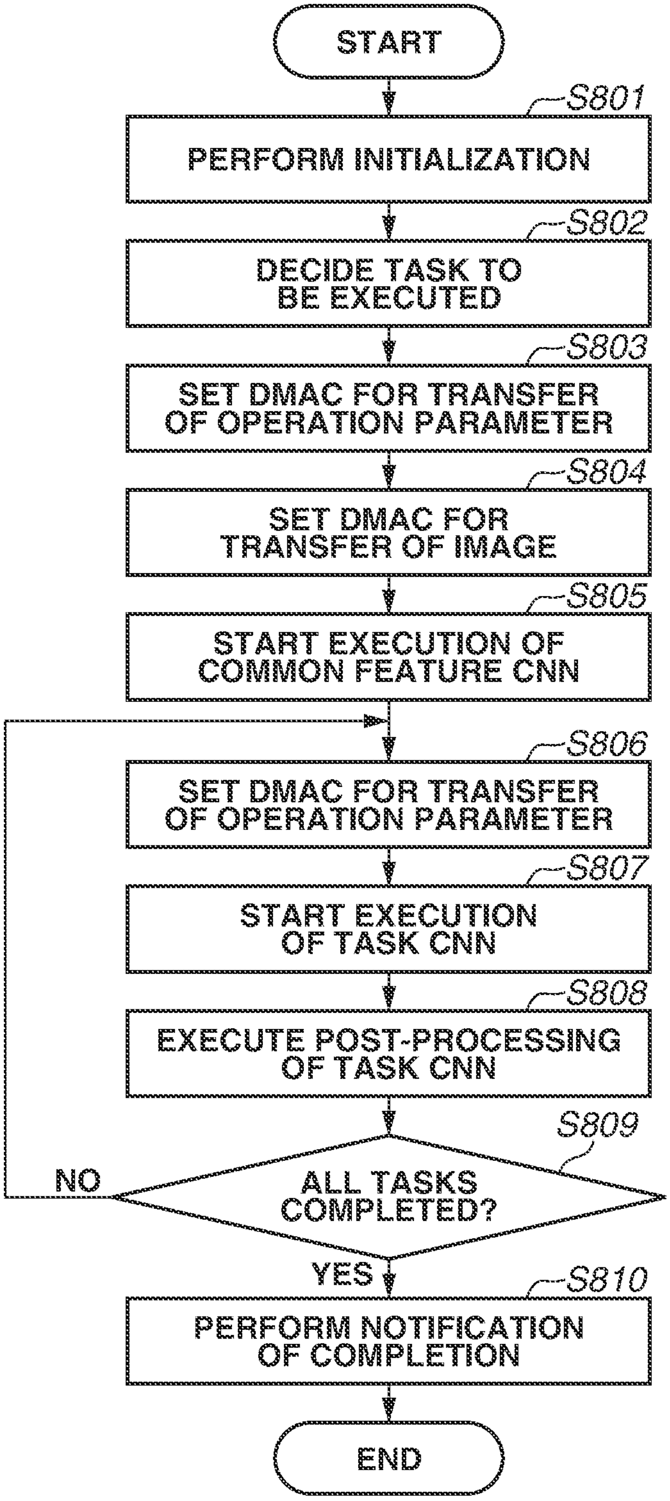
FIG. 8 is a flowchart illustrating operations of a control unit according to one or more aspects of the present disclosure.
Figure 9:
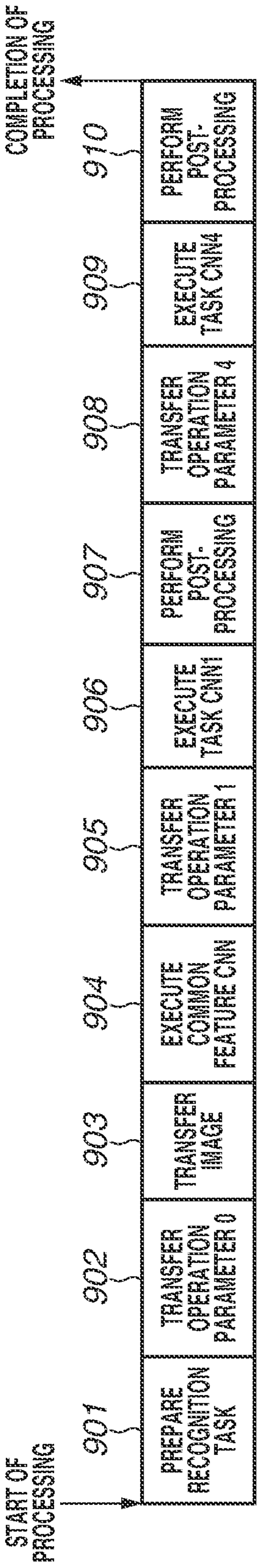
FIG. 9 is a time-line chart of operations of the multitask recognition processing unit according to one or more aspects of the present disclosure.

FIG. 8 is a flowchart illustrating operations performed by the control unit 107. FIG. 9 is a time-line chart illustrating operations of multitask recognition according to the present exemplary embodiment. The multitask recognition operations according to the present exemplary embodiment will be described with reference to FIGS. 8 and 9.

In step S801, initialization processing is performed. In the initialization processing, various types of initialization are performed after activation and before the multitask recognition processing unit 201 executes processing. In step S802, when the CPU 203 issues an instruction to start processing, the control unit 107 checks the setting content of the register definition 707 of the recognition task designation unit 108 to decide a recognition task to be executed. In step S803, the control unit 107 sets the DMAC for transferring an operation parameter for the common CNN 502 for the common feature. The control unit 107 decides the address and size of the storage destination of each operation parameter from the offset information 701, and sets the corresponding information to the DMAC. The convolution arithmetic processing unit 103 operates in accordance with the content of the data group to be transferred.

In step S804, the control unit 107 sets the DMAC for transferring image data. In step S805, the control unit 107 instructs the DMAC 102 to start the transfer and instructs the convolution arithmetic processing unit 103 to start the CNN operation processing. The convolution arithmetic processing unit 103 executes the CNN operation processing on the image data in accordance with the operation parameter transferred by the DMAC. In the CNN operation processing, the common feature to be used for the recognition tasks is extracted. The extracted common feature is stored in the CNN feature buffer 105.

Upon detection of completion of the CNN operation, in step S806, the control unit 107 processes the setting of the DMAC for transferring an operation parameter corresponding to the recognition task decided in step S802. For example, if the recognition tasks 1 and 4 are designated by the recognition task designation unit 108, first, the control unit 107 process the setting of the DMAC for transferring the operation parameter corresponding to the recognition task 1. Next, in step S807, the control unit 107 issues an instruction to start the operation of the task CNN1 corresponding to the recognition task 1. Upon detection of completion of execution of the task CNN1, in step S808, post-processing corresponding to the task CNN1 is executed. The post-processing includes processing of picking up the coordinates and reliability of a detection target from the generated results of the CNN operation and storing the coordinates and reliability in the operation area of the RAM 205 in a predetermined format.

In step S809, the control unit 107 determines whether all the recognition tasks designated by the recognition task designation unit 108 have been executed. If all the tasks have not been completed (NO in step S809), the process returns to setting for transfer of an operation parameter (step S806), and the control unit 107 controls the preparation and execution of the task to be executed next. Upon completion of execution of all the recognition tasks (YES in step S809), the control unit 107 issues a notice of completion of the processing to the CPU 203. The notice of completion is provided by a method of, for example, enabling an interrupt signal (not illustrated) of the CPU 203.

FIG. 9 is a time-line chart Illustrating operations of the multitask recognition processing unit 201 based on the sequence illustrated in FIG. 8. In the present exemplary embodiment, a case where the recognition tasks 1 and 4 are designated by the recognition task designation unit 108 is described.

When an instruction to start the processing is issued by the CPU 203, the control unit 107 actually transfers an operation parameter to decide a CNN recognition task to be executed, and makes preparation for calculating a common feature (901). Next, the control unit 107 transfers data (operation parameter 0) for calculating the common feature and stores the data in the CNN coefficient buffer 104 (902). The control unit 107 subsequently transfers image data and stores the image data in the CNN feature buffer 105 (903). Upon completion of storing the data, the control unit 107 executes the common feature CNN operation (904).

Upon completion of the common feature CNN operation, the control unit 107 issues an instruction to transfer the operation parameter 1 corresponding to the recognition task 1 (905), and the CNN corresponding to the recognition task 1 (task CNN1) is executed using the transferred operation parameter 1 (906). Upon completion of the execution of the CNN corresponding to the recognition task 1, the control unit 107 executes the post-processing (907). Subsequently, the control unit 107 issues an instruction to transfer the operation parameter 4 for the recognition task 4 (908), executes the CNN corresponding to the recognition task 4 (task CNN4) (909). Upon completion of execution of the CNN corresponding to the recognition task 4, the control unit 107 executes the post-processing corresponding to the recognition task 4 (910).

By the foregoing processing, the common feature extraction and the recognition tasks 1 and 4 are sequentially executed. After the completion of all the processing, the control unit 107 enables an interruption signal to notify the CPU 203 of the completion of the processing. Although FIG. 9 is a time-line chart for the case of executing the recognition tasks 1 and 4, the recognition task designation unit 108 can issue an instruction to execute the recognition tasks in an arbitrary combination.

As described above, according to the present exemplary embodiment, it is possible to implement the multitask recognition processing, which is performed by selecting recognition tasks to be executed depending on use cases, by simply preparing one type of operation parameter set including a plurality of operation parameters and storing the operation parameter set in advance in the RAM 205. In this case, since only the necessary operation parameters are transferred to the CNN coefficient buffer 104, the transfer band of the data bus 207 can be minimized. In the case of executing a series of multitask recognition, the CPU 203 is only required to select the recognition tasks to be executed and start the processing. Thus, also in the case of selectively executing the multitask recognition, the intervention of the CPU 203 (processing cost of the CPU 203) can be minimized.

Figure 10:
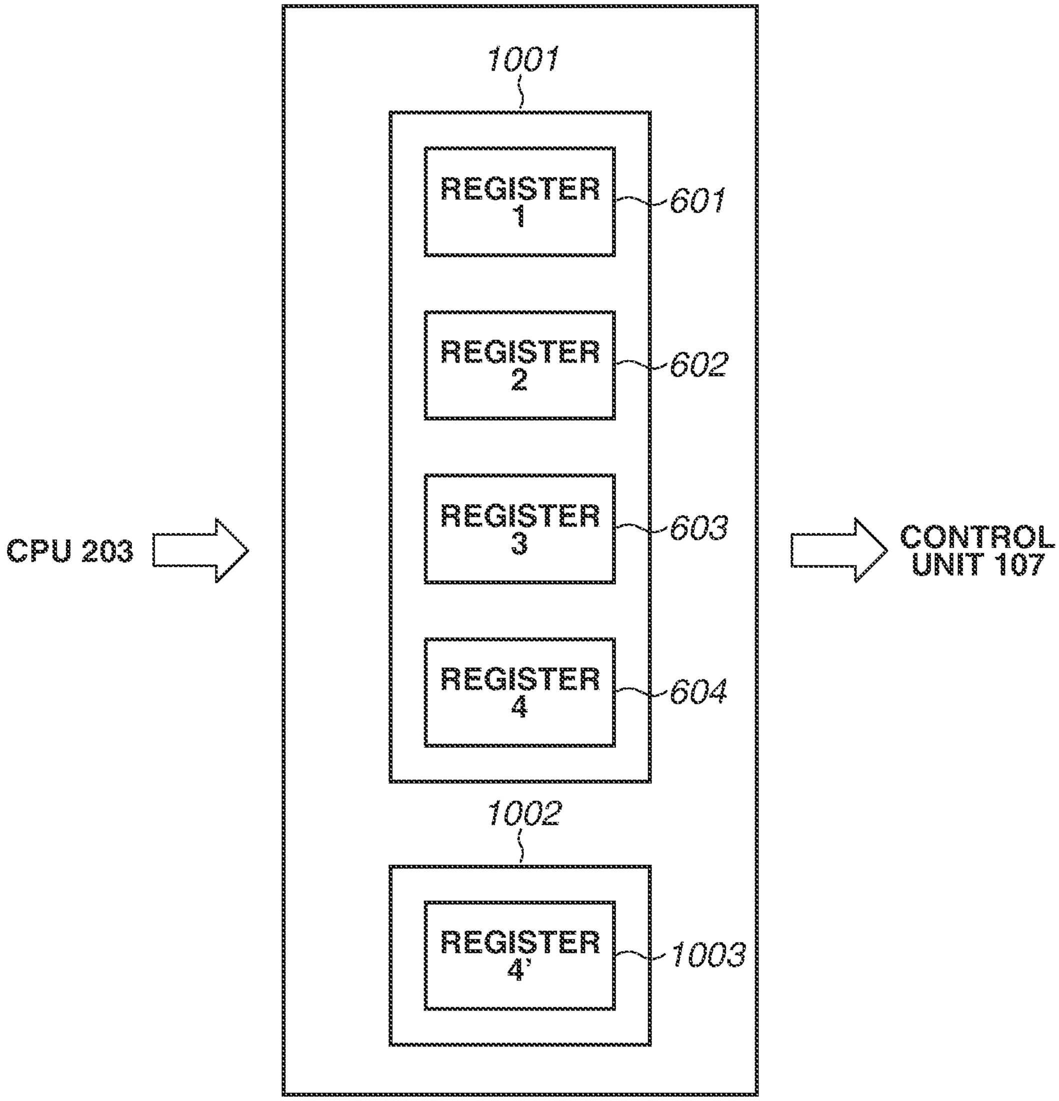
FIG. 10 is a diagram illustrating a configuration example of a recognition task designation unit according to one or more aspects of the present disclosure.

In a second exemplary embodiment, only differences from the first exemplary embodiment will be described. FIG. 10 is a diagram illustrating an example of a recognition task designation unit 108 according to the second exemplary embodiment. Besides a register set 1001 for selecting four recognition tasks, a register set 1002 for selecting sub-categories in the selected recognition tasks is added. A register 1003 (register 4') stores information for selecting a plurality of types of coefficients in the recognition task designated by the register 4.

Figure 11:
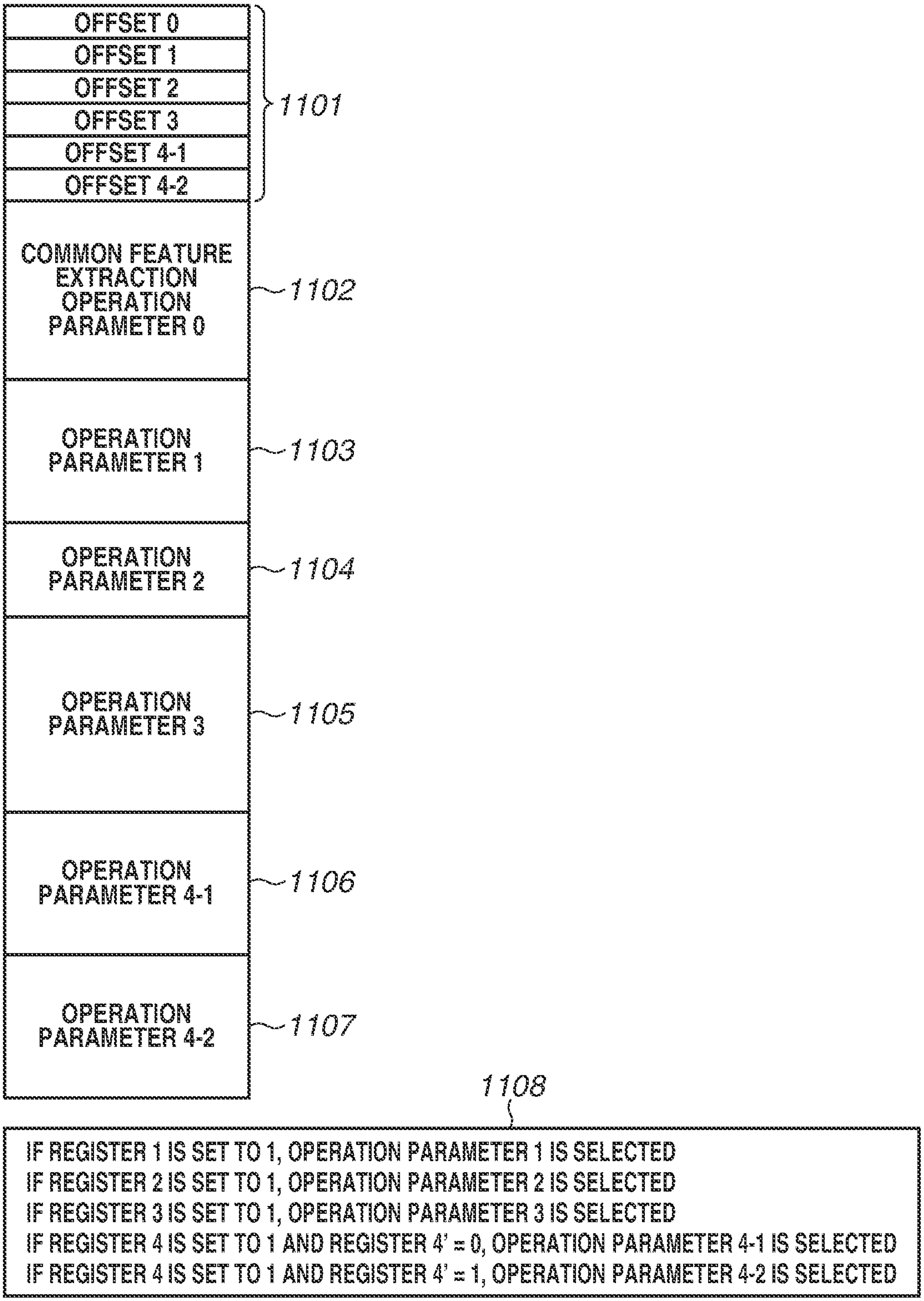
FIG. 11 is a diagram illustrating an example of an operation parameter set according to one or more aspects of the present disclosure.

FIG. 11 is a diagram illustrating an example of an operation parameter set according to the second exemplary embodiment. As compared to the operation parameter set according to the first exemplary embodiment, an operation parameter 4 is extended to two types of operation parameter 4-1 (1106) and operation parameter 4-2 (1107). These are operation parameters for sub-dividing detection targets in the recognition task to be executed using the operation parameter 4. For example, in a case where the operation parameter 4 is intended for recognizing birds, the operation parameters 4-1 and 4-3 are used for selecting operation parameters by types of birds.

A control unit 107 controls CNN execution and executes post-processing in accordance with the recognition task 4 designated by the register 4 (604). As for the operation parameters to be used at that time, the corresponding operation parameter is transferred in accordance with the information of designated by the register 4' (1003) (if the register value is 0, the operation parameter 4-1 is selected, and if the register value is 1, the operation parameter 4-2 is selected). In this case, the content of the control processed by the control unit 107 is the same as that of the recognition task 4, the coefficients processed by the CNN are different.

That is, the control unit 107 processes tasks in different sub-categories by performing the same processing. A register definition 1108 according to the present exemplary embodiment is illustrated in FIG. 11. The register 4' (1003) is used to determine the content of the recognition task 4.

In the present exemplary embodiment, the register set 1002 is prepared in the recognition task designation unit 108 to designate sub-categories of recognition tasks into which the recognition task are sub-divided. This makes it possible to implement multitask recognition in accordance with various use cases without complicating the processing configuration of the control unit 107.

Figure 12:
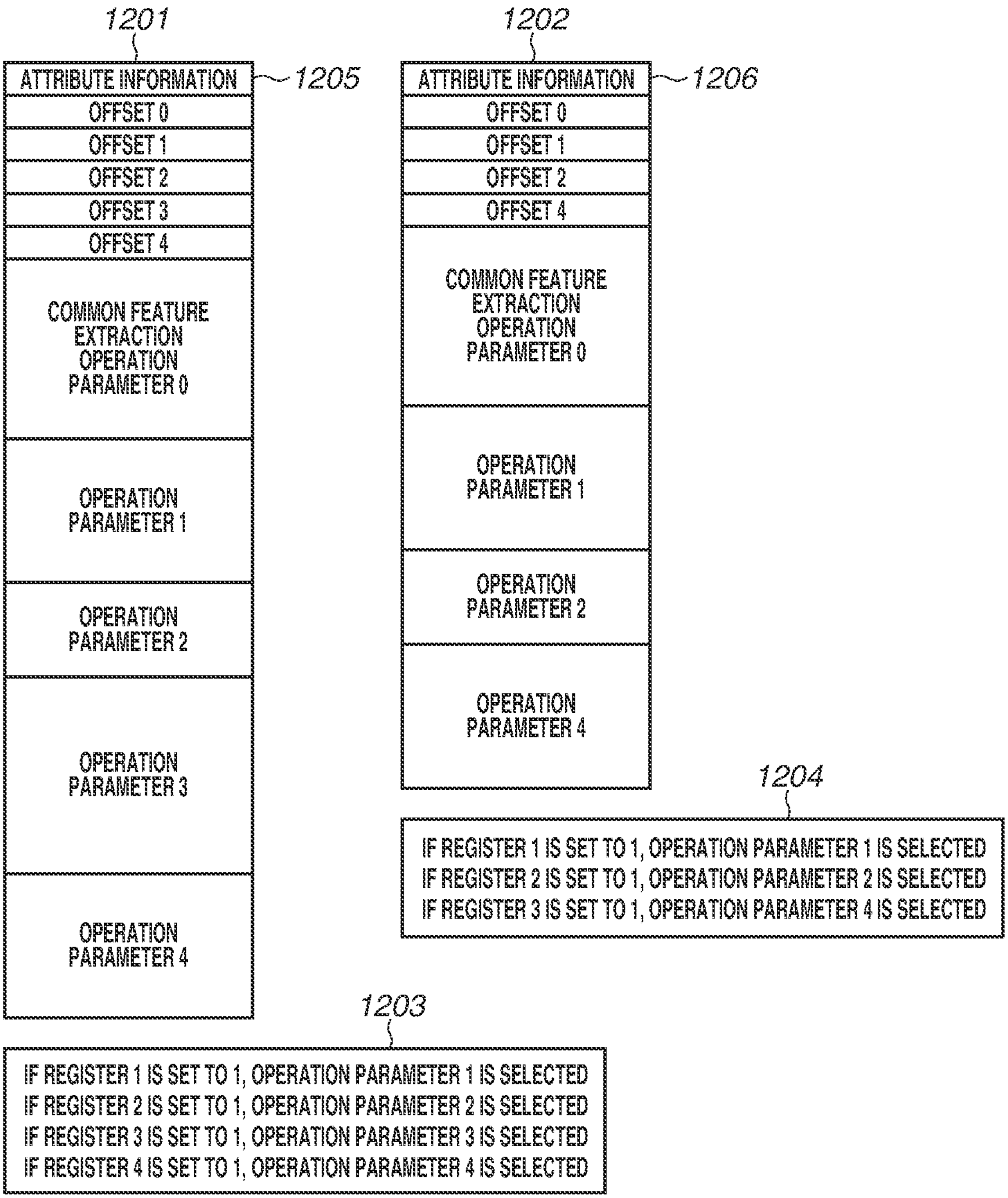
FIG. 12 is a diagram illustrating examples of operation parameter sets according to one or more aspects of the present disclosure.

In a third exemplary embodiment, only differences from the first exemplary embodiment will be described. FIG. 12 is a diagram illustrating examples of two types of operation parameter sets used in the third exemplary embodiment.

An operation parameter set 1201 includes four operation parameters as in the first exemplary embodiment, and an operation parameter set 1202 includes three operation parameters. These operation parameters are stored in a RAM 205, and are selected for use by a storage destination address designation unit 109. Register definitions 1203 and 1204 are register definitions for a recognition task designation unit 108 in the cases of using the operation parameter sets 1201 and 1202, respectively.

In the third exemplary embodiment, one set is selected from a plurality of operation parameter sets, and recognition tasks are executed in accordance with the definition of the recognition task designation unit 108 which corresponds to the selected operation parameter set. That is, the meaning of the register definition of the recognition task designation unit 108 differs depending on the operation parameter set. Attribute information 1205 and attribute information 1206 each have a record of the type of the operation parameter set. A control unit 107 decides the type of the operation parameter set in accordance with the attribute information (1205, 1206), and controls a multitask recognition processing unit 201 in accordance with the definition content (1203, 1204) of the recognition task designation unit 108 corresponding to the type of the operation parameter set.

In this manner, by executing processing while changing a register definition for each operation parameter, set with a change in the register definition of the recognition task designation unit 108 it makes it possible to selectively execute various types of multitask recognition processing using the common recognition task designation unit 108 without adding hardware.

Other Exemplary Embodiments

In the above-described exemplary embodiments, recognition processing using CNN has been described above as an example. However, the present disclosure is not limited to this example but is applicable to various recognition algorithms. For example, the present disclosure is also applicable to recognition algorithms other than the CNN such as Multilayer Perceptron and Transformer. The present disclosure is also applicable to the method by which the algorithm for acquiring a common feature and an algorithm for processing a recognition task are different. The present disclosure is further applicable to a case in which the algorithms include different algorithms for different recognition tasks.

In the above-described exemplary embodiments, the CPU 203 executes designation of a recognition task in the recognition task designation unit 108. However, the present disclosure is not limited to this configuration. The multitask recognition processing unit 201 may autonomously select a recognition task in accordance with a result of a specific recognition task or results of a plurality of recognition tasks.

In the above-described exemplary embodiments, the case where CNN is started after transfer of an image has been described. Alternatively, the CNN may be executed by line processing so that the CNN operation can be executed while the image is transferred. In that case, the CNN coefficient buffer 104 holds coupling coefficients of a plurality of layers.

In the above-described exemplary embodiments, the case where the convolutional operation according to the present disclosure is processed by hardware. Alternatively, the convolutional operation may be processed by a processor such as a CPU, a graphics processing unit (GPU), or a digital signal processing unit (DSP).

The present disclosure can be carried out by processing of supplying a program for implementing one or more functions in the above-described exemplary embodiments to a system or an apparatus via a network or a storage medium, and reading and executing the program by one or more processors in the system or the apparatus.

Furthermore, the present disclosure can be carried out by a circuit for implementing the one or more functions (for example, an application specific integrated circuit (ASIC)).

Some exemplary embodiments of the present disclosure have been described above. Note that the present disclosure is not limited to these exemplary embodiments, and can be modified and changed in various manners within the scope of the gist of the present disclosure.

According to the present disclosure, it is possible to provide a data processing apparatus that efficiently executes a plurality of recognition tasks selected in an arbitrary combination depending on use cases.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-190841, filed Nov. 29, 2022, which is hereby incorporated by reference herein in its entirety.

What is claimed is:

1. A data processing apparatus comprising:

one or more processors;

one or more memories including instructions stored thereon that, when executed by the one or more processors, cause the data processing apparatus to function as:

a storage unit configured to store a plurality of types of parameter groups to be used in a plurality of types of recognition tasks;

a selection unit configured to select two or more recognition tasks to be executed from among the plurality of types of recognition tasks;

a holding unit configured to hold parameter groups;

a transfer unit configured to transfer parameter groups to be used in the two or more recognition tasks in sequence from the storage unit to the holding unit; and an execution unit configured to execute the two or more recognition tasks in sequence using the parameter groups held in the holding unit, wherein the plurality of types of parameter groups includes a common parameter group for extracting, from an input image, common feature data to be used in common in the plurality of types of recognition tasks, wherein the transfer unit transfers the common parameter group prior to transferring other parameter groups of the plurality of types of parameter groups, and wherein the execution unit extracts the common feature data from the input image using the common parameter group, and executes the two or more recognition tasks in sequence using the common feature data.

2. The data processing apparatus according to claim 1, wherein the selection unit selects one of the two or more recognition tasks at a time, wherein the transfer unit transfers a parameter group to be used in the selected one recognition task, and wherein the execution unit executes the selected one recognition task using the transferred parameter group.

3. The data processing apparatus according to claim 1, further comprising a designation unit configured to designate storage destinations of the plurality of types of parameter groups in the storage unit, and wherein the transfer unit transfers the parameter groups to be used in the two or more recognition tasks in sequence, based on the storage destinations.

4. The data processing apparatus according to claim 3, wherein the storage destinations in the storage unit store respective pieces of offset information on the plurality of types of parameter groups, and wherein the transfer unit transfers the parameter groups to be used in the two or more recognition tasks in sequence based on the storage destinations and the pieces of offset information.

5. The data processing apparatus according to claim 3, wherein the storage unit stores a plurality of sets of the plurality of types of parameter groups, and wherein the designation unit switches among the plurality of types of parameter groups depending on which of storage destinations of the plurality of sets is designated.

6. The data processing apparatus according to claim 5, wherein the storage unit stores the plurality of sets of the plurality of types of parameter groups together with attribute information for each set, and wherein the data processing apparatus further comprises a control unit configured to control execution of the two or more recognition tasks by the execution unit based on the attribute information.

7. The data processing apparatus according to claim 1, wherein the plurality of types of recognition tasks further includes a plurality of sub-categorized recognition tasks, and wherein the selection unit further selects sub-categorized recognition tasks to be executed from a plurality of sub-categorized recognition tasks included in selected recognition tasks.

8. The data processing apparatus according to claim 7, wherein recognition targets of the plurality of sub-categorized recognition tasks are respective sub-categorized recognition targets into which recognition targets of the recognition tasks including the plurality of sub-categorized recognition tasks are sub-categorized.

9. The data processing apparatus according to claim 1, wherein the execution unit is a hierarchical operation unit, and wherein the parameter groups are coupling coefficients of the hierarchical operation unit.

10. The data processing apparatus according to claim 9, wherein the hierarchical operation unit is a neural network.

11. A data processing method for a data processing apparatus including a storage unit configured to store a plurality of types of parameter groups to be used in a plurality of types of recognition tasks and a holding unit configured to hold parameter groups, the data processing method comprising:

selecting two or more recognition tasks to be executed from among the plurality of types of recognition tasks;

transferring parameter groups to be used in the two or more recognition tasks in sequence from the storage unit to the holding unit; and executing the two or more recognition tasks in sequence using the parameter groups held in the holding unit, wherein the plurality of types of parameter groups includes a common parameter group for extracting, from an input image, common feature data to be used in common in the plurality of types of recognition tasks, wherein a transfer unit transfers the common parameter group prior to transferring other parameter groups of the plurality of types of parameter groups, and wherein a execution unit extracts the common feature data from the input image using the common parameter group, and executes the two or more recognition tasks in sequence using the common feature data.

* * * * *